Figure 1:
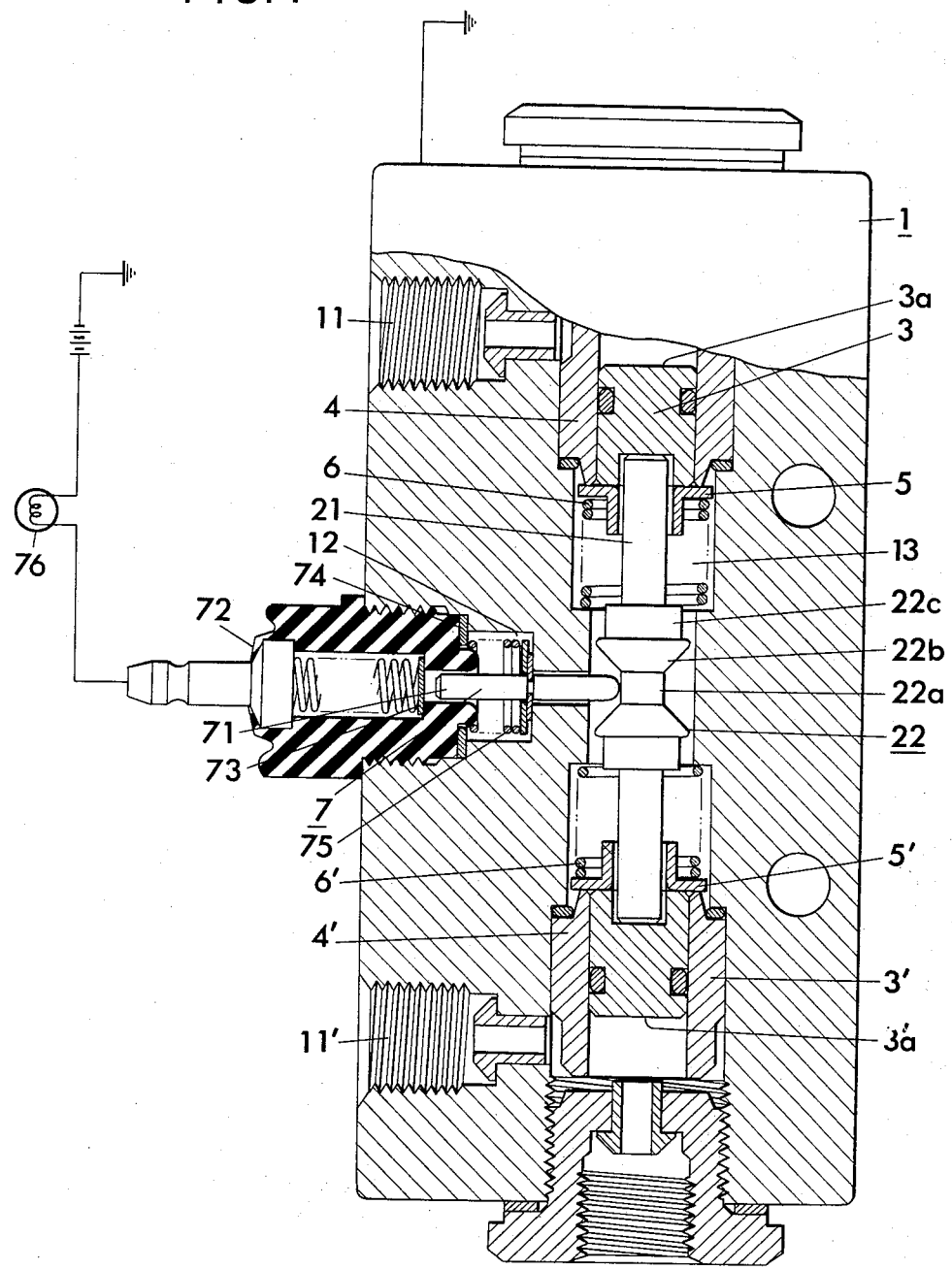

United States Patent [19]
Ito

[11] 3,810,142
[45] May 7, 1974

[54] DEVICE FOR DETECTING AND INDICATING A DIFFERENCE IN HYDRAULIC PRESSURE

[75] Inventor: Shinya Ito, Tsushima, Japan

[73] Assignee: Kabushiki Kaisha Tokai Rika Denki Seisaku-Sho, Nishikasugai-gun, Aichi Prefecture, Japan

[22] Filed: July 20, 1972

[21] Appl. No.: 273,577

[30] Foreign Application Priority Data
July 22, 1971   Japan.............................. 46-64212

[52] U.S. Cl............ 340/242, 188/151 A, 340/52 C
[51] Int. Cl..... G08b 21/00, B60q 1/44, B60t 17/22
[58] Field of Search........ 340/244 E, 52 C, 59, 242, 340/240; 188/151 A; 303/6 C; 200/82 D

[56] References Cited
UNITED STATES PATENTS

| | | | |
|---|---|---|---|
| 3,674,954 | 7/1972 | Kish et al...................... | 340/52 C X |
| 3,699,513 | 10/1972 | Nicodeme......................... | 340/52 C |
| 3,602,883 | 8/1971 | Belart................................ | 340/52 C |

Primary Examiner—John W. Caldwell
Assistant Examiner—Daniel Myer
Attorney, Agent, or Firm—Woodhams, Blanchard and Flynn

[57] ABSTRACT

A device for detecting and indicating a difference in hydraulic pressure which comprises a slide bar adapted to slide in the horizontal direction upon receiving hydraulic pressure applied thereto and having a gourd-shaped portion at its central portion; switching mechanism adapted to be actuated through the movement of said slide bar; and an indicating lamp. The present device is capable of indicating a possible difference in hydraulic pressure and keeping such an indication until the difference in hydraulic pressure is eliminated.

4 Claims, 4 Drawing Figures

DEVICE FOR DETECTING AND INDICATING A DIFFERENCE IN HYDRAULIC PRESSURE

The present invention relates to a device for detecting and indicating a difference in hydraulic pressure and more particularly to a device for detecting and indicating a difference in hydraulic pressure in a hydraulic transmission system.

In a hydraulic transmission system for controlling or operating two objects by equal oil pressure, a possible pressure difference between oil pressures for controlling said two objects, occuring due to some accidental trouble such as leakage of oil etc. would cause, for example in a hydraulic brake, difference in braking force which possibly invites a serious danger.

The present invention has been made to eliminate the above-mentioned trouble in a hydraulic transmission system.

It is therefore an object of the present invention to provide a device for detecting and indicating a pressure difference in a hydraulic transmission system for controlling two objects by equal oil pressure.

It is another object of the present invention to provide a device for detecting and indicating a pressure difference which, once it detects such a pressure difference, maintains its detecting and indicating operation for alarm purposes until the oil pressure for the respective objects becomes equal.

According to the present invention, there is provided a device for detecting and indicating a difference in hydraulic pressure, comprising a slide for which is freely movable in the horizontal direction and has a neck-shaped portion at the central portion thereof; pistons respectively fitted to opposite end portions of said slide bar which respectively receive hydraulic pressures at their outer sides to urge said slide bar towards the center; springs respectively provided on the other sides of the pistons to urge the pistons outwardly; and a switching mechanism abutting on said neck-shaped portion of the slide bar at the lower end of said switching mechanism and adapted to operate upon movement of said slide bar, whereby a possible difference in hydraulic pressure actuates said switching mechanism through the movement of the slide bar.

Figure 2A:
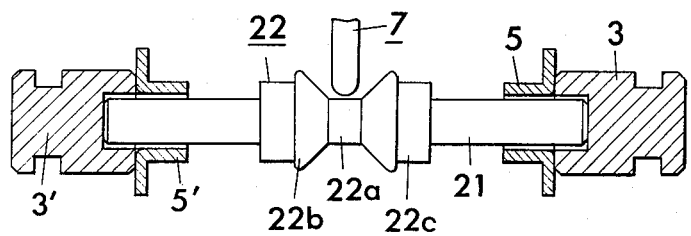
Figure 2B:
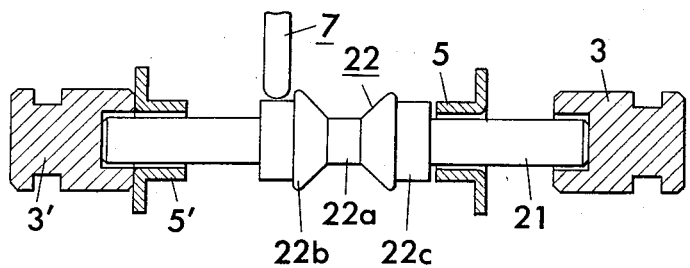
Figure 2C:
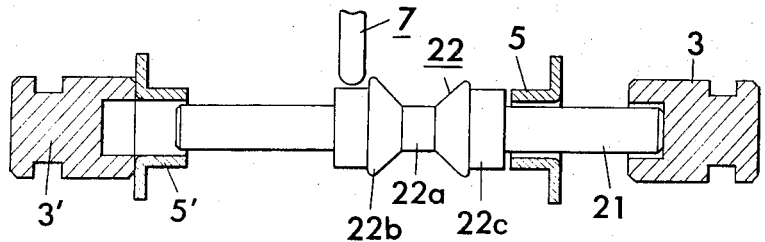

The invention will be better understood from the following description taken in connection with the accompanying drawings in which:

FIG. 1 is a vertical cross sectional view of a device for detecting a pressure difference in accordance with the present invention; and FIGS. 2A, 2B and 2C are explanatory views of the device shown in FIG. 1, illustrating the operating conditions thereof.

With reference now to the drawings and more particularly to FIG. 1 thereof, there is illustrated one embodiment of the present invention. The device for detecting a pressure difference according to the present invention consists of a pressure-difference sensing mechanism section and a switching mechanism section. In the sensing mechanism section of the device, numeral 1 designates a body made of a conductive material such as metal and having two oil-intakes 11 and 11' respectively at right and left sides of the body 1 and a horizontal chamber 13 communicating with said oil-intakes 11 and 11'. In said horizontal chamber 13 is disposed a slide bar 21 which is slidable right and left therein. A right piston 3 and a left piston 3' are fitted to a right and left end of the slide bar 21, respectively and inserted in respective rings 4 and 4' fixed to the horizontal chamber 13 so as to slide therethrough. The pressures of the oils respectively supplied through the oil-intakes 11 and 11' act on the outer faces 3a and 3a' of the pistons 3 and 3', respectively, to push them towards the center.

The slide bar 21 is not only inserted at its opposite end portion in the respective pistons 3 and 3' as mentioned above but also is supported by flange-like spring-bearings 5 and 5', so that it can freely slide right and left. Said slide bar 21 has a central portion 22 of particular form such as a dumbbell-shape. Springs 6 and 6' are fitted to the inner faces of the spring bearings 5 and 5', respectively and disposed around the slide bar 21 so as not to prevent the movement of the slide bar 21 and to act on the pistons 3 and 3' through the spring-bearings 5 and 5' to push said pistons 3 and 3' outwardly.

On the other hand, in the switching mechanism section 7, a contact rod 71 made of a conductive material is vertically disposed in a central opening 12 formed in the body 1 so as to abut, at its lower end, upon the portion 22 of the slide bar 21. Said dumbbell-shaped portion 22 has, at its central position, a neck portion 22a of reduced diameter, at the outer position thereof, portions 22b of increasing diameter and, at its outermost positions, portions 22c of enlarged diameter. When the oil pressures of the right and left sides in the chamber 13 are equal to each other and the slide bar 21 is centrally positioned, the lower end of the contact rod 71 is located on the portion 22a of reduced diameter. In this condition, the upper end of said contact switch 71 is positioned just below a resilient contact 73 keeping a little distance therefrom. Said resilient contact 73 is disposed in an opening of a holder 72 which is made of a non-conductive material such as synthetic resin and secured to the body 1 in its central opening 12. A grounding plate 74 of a conductive material is fixed to said holder 72 and adapted to contact the body 1. With this construction, when the contact rod 71 is raised a little, it is brought into contact with the resilient contact 73, thereby to light a lamp 76 through a circuit formed of said resilient contact 73, the contact rod 71, a spring 75 as mentioned below, the grounding plate 74 and the body 1.

In order to prevent a possible undesirable movement of the contact rod 71 due to vibration, a spring 75 is fitted around the contact rod 71 to urge it so as to abut its lower end upon the slide bar 21.

Thus, it will be seen that when a pressure of the oil from the right intake 11 is accidentally reduced, the pressure in the horizontal chamber 13 is unbalanced in the right and left side thereof to move the left piston 3' rightwardly, together with the slide bar 21, against the action of the left spring 6'. In this instance, the contact rod 71 abutting on the central portion 22a of the slide bar 21 is guided onto the portion 22c of enlarged diameter, passing the portion 22b of increasing diameter, thereby to actuate the resilient contact 73 and light the lamp 76. [FIG. 2(B)]

In this condition, when an oil pressure is eliminated by stopping the operation of the hydraulic transmission system, only the left piston 3' is restored to its original position by the action of the left spring 6'. While, the slide bar 21 is maintained in its rightwardly biased position through the engagement between the contact rod 71 and the portion 22b of increasing diameter, so that the lamp 76 is kept to be lit for alarming of a leakage. [FIG. 2(C)]

When the right and left oil pressures become equal to each other again after fixing a leaky portion, the same pressure is applied to the opposite end faces 3a and 3a' of the pistons 3 and 3'. However, the movement of the left piston 3' is somewhat prevented by the action of the left spring 6', while the right piston 3 free from the resistance of the spring is moved leftwardly together with the slide bar 21 to return to its original position. [FIG. 2(A)] As a result, the lamp 76 is extinguished to inform that there is no more failure or trouble in the hydraulic transmission system.

As mentioned above, in the present invention, the contact rod is abutted on the dumbbell-formed portion of the slide bar which is horizontally movable by receiving oil pressures applied thereto, thereby to detect the movement of the slide bar and indicate the difference in hydraulic pressure so that the detecting and indication operation is effected remarkably stably with simplified structure.

What is claimed is:

1. A control device for detecting and signalling a difference in two fluid pressures, comprising;
    a body having a longitudinal bore therein, said body having first and second inlets communicating with opposite ends of said bore for supplying pressurized fluid from fluid pressure system means to said opposite ends of said bore;
    a slide bar slidably disposed in said bore for longitudinal movement between said inlets, said slide bar having a switch actuating portion thereon;
    a pair of pistons slidably disposed in said bore and associated with the opposite ends of said slide bar and disposed between said inlets and said slide bar so that the pressurized fluid supplied through said inlets is effective to urge said pistons inwardly of said bore, said pistons each having an abutment surface normally disposed in abutting contact with the adjacent end of said slide bar;
    a member associated with each piston for movement therewith inwardly of said bore, said member being adapted to abut against a stop in said body in the outer position of said member, said piston being movable relative to said member in a direction outwardly of said bore when said member is abutting against said stop;
    a pair of springs disposed in said bore, the springs abutting at corresponding ends against a stationary part of said body and
    the opposite ends of said springs abutting against said members for resiliently urging said members toward said stops and opposing movement of said pistons inwardly of said bore;
    said stops being spaced apart a distance such that when said members are abutting against said stops and said pistons are abutting against the ends of said slide bar, said slide bar is in a neutral position, each piston being movable outwardly of its associated member by a corresponding movement of said slide bar out of its neutral position caused by a difference in the pressures of the fluids supplied through the inlets;
    electric switch means having an actuator associated with said switch actuating portion of said slide bar for movement between a first condition when said slide bar is in said neutral position and a second condition when said slide bar is shifted out of said neutral position;
    and a warning circuit connected to said switch means for actuation thereby.

2. A device according to claim 1, in which each of said members comprises a wall slidably sleeved on said slide bar and extending transversely relative to said bore, said wall having a first portion adapted to abut against the inner side of said piston for inward movement therewith, said wall having a second portion adapted to abut against the stop, the adjacent end of said spring engaging said wall and resiliently urging it against said stop.

3. A device according to claim 1, in which said body has a switch chamber extending transversely from said bore at a location between the ends of said bore, said body also having an opening extending between said switch chamber and said bore and providing communication therebetween;
    said switch means being disposed in said switch chamber and comprising a nonconductive casing, a contact rod movable in said casing and projecting through said opening for movement by said slide bar, a resiliently mounted contact connected to said warning circuit and disposed in said casing for engagement by said contact rod when said slide bar is moved out of neutral position and a conductive grounding member electrically connected to said contact rod.

4. A device according to claim 3, in which said switch actuating portion of said slide bar comprises a substantially dumbbell-shaped portion having a neck of reduced diameter, a pair of inclined cam surfaces extending outwardly from the opposite sides of said neck portion and a pair of enlarged portions at the outer ends of said cam surfaces, said neck being disposed in confronting relationship to said opening when the slide bar is in its neutral position for receiving the inner end of said contact rod.

* * * * *